United States Patent Office 3,362,912
Patented Jan. 9, 1968

3,362,912
CORROSION RESTRAINING COMPOSITION
Eric Milton Chadwick and Richard Stanley Moreton, Manchester, England, assignors to Imperial Chemical Industries Limited, London, England, a corporation of Great Britain
No Drawing. Filed Feb. 1, 1965, Ser. No. 429,611
Claims priority, application Great Britain, Feb. 18, 1964, 6,713/64
11 Claims. (Cl. 252—149)

ABSTRACT OF THE DISCLOSURE

A corrosion restraining composition which is a mixture of di-n-butylthiourea and a surface active agent obtained by the reaction of an aldehyde with a substituted polynuclear aromatic compound bearing as a substitutent a polyethenoxy chain.

---

This invention relates to corrosion restraining compositions and more particularly it relates to liquid compositions for restraining the corrosion of ferrous metals in acid pickling baths.

Ferrous metals, such as steel, which are subjected to working at elevated temperatures during the course of manufacture become coated with a layer of oxide impurity, often referred to as mill scale. For many subsequent processing operations, such as coating or plating, it is necessary to remove the layer of oxide scale and it is usual to do this by treating the metal in a bath of aqueous acid, an operation referred to as acid pickling. The acid commonly used for this purpose is sulphuric acid, although other acids such as hydrochloric acid, phosphoric acid and sulphamic acid may be used. Once the layer of oxide scale is removed, the acid is free to attack the exposed metal surface and in order to reduce the attack on the metal itself as much as possible it is advantageous to add a corrosion restrainer to the acid pickling bath.

In some cases it is the practice in the industry to recover acid by removal of ferrous sulphate from the spent acid pickling liquors. This can be accomplished by various techniques but where air blowing is used to assist cooling prior to removal of "copperas" ($FeSO_4 \cdot 7H_2O$) or where submerged combustion or spray evaporation is used to recover ferrous sulphate monohydrate it is desirable that any additives to the acid pickling process should not give rise to appreciable foam formation at the subsequent acid/iron salt recovery stage.

We have now found that a particularly valuable corrosion-restraining composition for addition to acid pickling baths may be obtained by mixing together di-n-butylthiourea with a surface active agent obtained by reacting a substituted polynuclear aromatic compound bearing as a substituent a polyethenoxy chain with an aldehyde, such surface active agents being more fully described in copending U.S. patent application No. 344,553.

Thus the invention provides a corrosion restraining composition which comprises a mixture of di-n-butylthiourea and a surface active agent of the general formula—

$$H-A-\underset{\underset{X}{|}}{\overset{\overset{R}{|}}{C}H}-\left[A-\underset{\underset{X}{|}}{\overset{\overset{R}{|}}{C}H}\right]_n-A-H$$

in which
A represents a trivalent polynuclear radical containing at least 2 fused aromatic rings optionally substituted by chlorine but unsubstituted by alkyl groups,
X represents—

$$-O(CH_2CH_2O)_xCH_2CH_2OH$$
$$-CO \cdot O(CH_2CH_2O)_xCH_2CH_2OH$$
$$-S(CH_2CH_2O)_xCH_2CH_2OH$$
$$-NH(CH_2CH_2O)_xCH_2CH_2OH$$

or $$-N\begin{array}{c}(CH_2CH_2O)_xCH_2CH_2OH\\ \\ (CH_2CH_2O)_xCH_2CH_2OH\end{array}$$

$x$ being an integer from 1 to 100 and preferably from 4 to 20,
$n$ is zero or a number greater than zero, and
R represents hydrogen or a monovalent hydrocarbon radical containing up to 6 carbon atoms.

The surface active agents used in the compositions of our invention are obtained as described in copending U.S. patent application No. 344,553. Especially suitable surface active agents are those obtained by condensing formaldehyde or paraform in presence of a strong mineral acid with a reaction product of α- or β-naphthol with from 4 to 30 moles of ethylene oxide. Such compounds have the above general formula in which A represents a naphthalene nucleus, X represents $$-O(CH_2CH_2O)_xCH_2CH_2OH$$

and R represents hydrogen. A particular example of such a surface active agent is the product obtained as described in Example 3 of the above copending application by condensing β-naphthol with 15 moles of ethylene oxide and condensing the product with paraform.

Preferably a proportion of a liquid hydroxylated organic compound such as a glycol or diglycol is added to the mixture, propylene glycol solvents such as monopropylene glycol, dipropylene glycol, tripropylene glycol or mixtures of two or more of these glycols being preferred. Particularly suitable are mixtures of a major proportion by weight of a dipropylene glycol with a minor proportion by weight of monopropylene glycol. Homogeneous liquid compositions may be obtained by the use of such solvents.

Certain of the liquid compositions of our invention have the further advantage that they remain fluid and readily pourable down to quite low temperatures. This is particularly important since in some acid pickling plants in which acid pickling restrainers are used it is not always possible to store them in heated conditions in cold weather.

The amount of the composition which is added to the acid pickling bath may be varied over wide limits but we prefer to add between 0.01% and 0.5% of the composition calculated on the weight of 100% acid. Thus in the case of sulphuric acid we prefer to add between 0.15 lb. and 8 lb. of the composition per ton of 76% sulphuric acid (B.O.V.) in the acid pickling liquors. The concentration of sulphuric acid in the acid pickling liquors is usually between 2% and 25% by weight. Especially suitable proportions by weight of the constituents of the mixture are—

| | Parts by weight |
|---|---|
| Di-n-butylthiourea | 1 |
| Surface active agent | 1–9 |
| Liquid hydroxylated organic compound | 0–8 |

The mixtures may be made by simple mixing of the ingredients optionally with the application of heat.

In addition to the ingredients referred to above other materials such as diluents and colouring matters may be added if desired.

The products are excellent corrosion restrainers in acid pickling and have little tendency to foam.

The invention is illustrated by the following examples—

Example 1

A mixture of 10 parts by weight of di-n-butylthiourea and 20 parts by weight of a β-naphthol/15 moles ethylene oxide/formaldehyde condensate prepared according to Example 3 of U.S. patent application No. 344,553 was dissolved in 70 parts by weight of dipropylene glycol. The product was a viscous liquid.

Example 2

A 40 cm. length of degreased bright-annealed mild steel strip, 6 mm. wide and 0.3 mm. thick, was immersed in 20% wt./wt. aqueous sulphuric acid containing 0.02% wt./wt. of the composition of Example 1 for 15 minutes at 95° C. and was found to have lost 0.0400 gram in weight. A similar degreased mild steel strip treated under exactly the same conditions with 20% aqueous sulphuric acid omitting the composition of Example 1 was found to have lost 1.9500 grams in weight.

Example 3

The following table gives the percentage loss of weight of descaled mild steel strip (columns IV to VII) which has been immersed at a given temperature (column II) for a given time (column III) in a sulphuric acid pickling bath of a given acid strength (column I: expressed as a percentage weight/weight of 76% sulphuric acid) and containing either no corrosion restraining composition (column IV) or the amounts of the corrosion restraining composition of Example 1 indicated in the heading of columns V, VI and VII.

| I | II | III | IV | V | VI | VII |
|---|---|---|---|---|---|---|
| Acid bath strength (percent w./v. 76% $H_2SO_4$) | Temperature, °C. | Immersion time (minutes) | Percent weight loss on descaled mild steel strip | | | |
| | | | No restrainer | 1 lb. composition per ton, 76% $H_2SO_4$ | 2 lb. composition per ton, 76% $H_2SO_4$ | 4 lb. composition per ton, 76% $H_2SO_4$ |
| 7 | 65 | 60 | 1.06 | 0.06 | 0.03 | 0.02 |
| 7 | 80 | 30 | 1.61 | 0.11 | 0.02 | 0.04 |
| 20 | 95 | 35 | 18.9 | 0.46 | 0.27 | 0.18 |

Aeration of the aqueous acid solutions containing the corrosion restraining composition did not give rise to stable foams.

Example 4

The β-naphthol/15 moles ethylene oxide/formaldehyde condensate used to prepare the composition of Example 1 was prepared as follows—

100 parts of the condensate of β-naphthol with 15 moles of ethylene oxide were stirred whilst 4 parts of paraform and 2.26 parts of 65% sulphuric acid were added. The mixture was stirred for 16 hours at 90–95° C., cooled and the sulphuric acid neutralised with 5 parts of triethanolamine. Triethanolamine sulphate formed a lower liquid layer which was separated from the upper liquid product layer.

What we claim is:

1. A corrosion restraining composition which consists essentially of a mixture of di-n-butylthiourea and a polymeric surface active agent in which the basic monomer unit has the formula

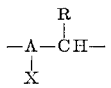

wherein A represents a trivalent naphthalene radical, X represents the group $-O(CH_2CH_2O)_xCH_2CH_2OH$ in which $x$ represents an integer of from 4 to 30 and R represents a hydrogen atom or a hydrocarbon radical containing up to 6 carbon atoms, said polymeric surface active agent being terminated by radicals selected from the group consisting of a hydrogen atom and a radical of the formula

where A and X have the same meaning above, said composition containing from 1 to 9 parts by weight of surface active agent for each part by weight of di-n-butylthiourea.

2. The corrosion restraining composition of claim 1 wherein the surface active agent R represents a hydrogen atom.

3. The corrosion restraining composition of claim 1 wherein in the surface active agent $x$ has the value of 14 and R represents a hydrogen atom.

4. The corrosion restraining composition of claim 1 which contains a liquid hydroxylated organic compound selected from the group consisting of monopropylene glycol, dipropylene glycol, tripropylene glycol and mixtures of at least two of these glycols, said composition containing up to 8 parts by weight of said liquid hydroxylated organic compound for each part by weight of di-n-butylthiourea.

5. The corrosion restraining composition of claim 4 wherein the glycol is propylene glycol and the diglycol is dipropylene glycol.

6. A corrosion restraining composition of claim 1 which comprises a mixture of about 10 parts by weight of di-n-butylthiourea and about 20 parts by weight of said polymeric surface active agent wherein $x$ has the value of 14 dissolved in about 70 parts by weight of dipropylene glycol.

7. An acid pickling bath for ferrous metals consisting of an aqueous acid selected from the group consisting of sulfuric acid, hydrochloric acid, phosphoric acid and sulphamic acid containing from 0.01% to 0.5% of the composition of claim 1 calculated on the weight of 100% acid.

8. The acid pickling bath of claim 7 in which the aqueous acid is 2% to 25% sulphuric acid by weight.

9. An acid pickling bath for ferrous metals consisting of an aqueous acid selected from the group consisting of sulfuric acid, hydrochloric acid, phosphoric acid and sulphamic acid containing from 0.01% to 0.5% of the composition of claim 4 calculated on the weight of 100% acid.

10. The acid pickling bath of claim 9 in which the aqueous acid is 2% to 25% sulphuric acid by weight.

11. An acid pickling bath for ferrous metals consisting of from 2% to 25% aqueous sulphuric acid by weight and containing a corrosion restraining composition of claim 1 which comprises a mixture of about 10 parts by weight of di-n-butylthiourea and about 20 parts by weight of said surface active agent wherein $x$ has the value of 14 dissolved in about 70 parts by weight of dipropylene glycol, the amount of the corrosion restraining composition present in the bath being between 0.5 lb. and 8 lb. per ton of 76% sulphuric acid present No references cited.

LEON D. ROSDOL, *Primary Examiner.*

S. D. SCHNEIDER, *Assistant Examiner.*